United States Patent
Lipson

(10) Patent No.: US 9,622,591 B2
(45) Date of Patent: Apr. 18, 2017

(54) DISPOSABLE COVER FOR A HIGH CHAIR

(71) Applicant: Richard Lipson, Phoenix, AZ (US)

(72) Inventor: Richard Lipson, Phoenix, AZ (US)

( * ) Notice: Subject to any disclaimer, the term of this patent is extended or adjusted under 35 U.S.C. 154(b) by 53 days.

(21) Appl. No.: 14/716,864

(22) Filed: May 19, 2015

(65) Prior Publication Data

US 2016/0338503 A1    Nov. 24, 2016

(51) Int. Cl.
| | |
|---|---|
| A47C 31/00 | (2006.01) |
| A47C 31/11 | (2006.01) |
| A47D 1/00 | (2006.01) |
| B60N 2/60 | (2006.01) |
| A47C 31/10 | (2006.01) |
| B60N 2/58 | (2006.01) |
| B62B 5/06 | (2006.01) |
| B60N 2/28 | (2006.01) |
| B62B 3/14 | (2006.01) |

(52) U.S. Cl.
CPC .............. *A47C 31/11* (2013.01); *A47D 1/00* (2013.01); *A47C 31/10* (2013.01); *B60N 2/28* (2013.01); *B60N 2/58* (2013.01); *B60N 2/5816* (2013.01); *B60N 2/60* (2013.01); *B60N 2/6027* (2013.01); *B60N 2/6036* (2013.01); *B62B 3/1448* (2013.01); *B62B 5/069* (2013.01)

(58) Field of Classification Search
CPC ... A47D 1/00; B60N 2/28; B60N 2/60; B60N 2/6036; B60N 2/6027; B60N 2/58; B60N 2/5816; B62B 5/069; B62B 3/1448; A47C 31/11; A47C 31/10

USPC ...... 297/219.1, 219.12, 229, 228.11, 228.12, 297/256.17
See application file for complete search history.

(56) References Cited

U.S. PATENT DOCUMENTS

| | | | | |
|---|---|---|---|---|
| 2,170,703 | A * | 8/1939 | Waxman | A41B 13/10 128/874 |
| 5,238,293 | A * | 8/1993 | Gibson | B62B 3/144 280/33.993 |
| 6,129,417 | A * | 10/2000 | Cohen-Fyffe | B62B 3/144 297/219.12 |
| 6,428,098 | B1* | 8/2002 | Allbaugh | A47D 1/00 297/219.12 |
| 6,491,996 | B2* | 12/2002 | Digangi | B32B 27/06 150/154 |
| 6,517,155 | B1* | 2/2003 | Landine | B62B 3/144 280/33.993 |
| 6,676,210 | B1 | 1/2004 | Peyton | |

(Continued)

*Primary Examiner* — Chi Q Nguyen
(74) *Attorney, Agent, or Firm* — Scott A. Hill; The Hill Law Firm, PLC

(57) ABSTRACT

For use with a high chair of the type commonly provided by a restaurant, a disposable cover has an inside portion that is nested into a seating volume of the high chair, and an outside portion that covers the outside of the high chair. There are leg apertures in the inside portion and outside portion such that a child's legs pass through the various leg apertures and desirably pull the disposable cover over a safety bar of the high chair, thereby properly positioning the disposable cover without the need for adhesives or fasteners. Complimentary pairs of seat belt apertures in the inside portion and outside portion may be provided to additionally position the disposable cover and prevent it from being pulled into the seating volume of the high chair by an active child.

19 Claims, 4 Drawing Sheets

(56) References Cited

U.S. PATENT DOCUMENTS

| | | | |
|---|---|---|---|
| 6,848,743 B1 * | 2/2005 | Collins | B62B 3/1456 |
| | | | 297/219.12 |
| 6,929,326 B2 | 8/2005 | Cohen-Fyffe | |
| 7,367,621 B1 * | 5/2008 | Han-Dressor | B62B 3/144 |
| | | | 297/219.12 |
| 7,840,302 B2 * | 11/2010 | Dobson | G05B 19/41875 |
| | | | 700/121 |
| 7,878,587 B1 | 2/2011 | Leach | |
| 8,042,869 B2 * | 10/2011 | McClintock | B62B 3/144 |
| | | | 297/219.12 |
| 8,113,580 B1 * | 2/2012 | Pusateri | A47C 31/11 |
| | | | 297/219.12 |
| 8,500,199 B2 | 8/2013 | Paulin | |
| 8,770,663 B2 * | 7/2014 | Zack | A47C 31/11 |
| | | | 297/181 |
| 2003/0227202 A1 * | 12/2003 | Endicott | A47D 15/006 |
| | | | 297/256.17 |
| 2005/0057080 A1 * | 3/2005 | Collins | A47D 1/00 |
| | | | 297/219.12 |
| 2008/0191529 A1 * | 8/2008 | Guercia | A47C 31/11 |
| | | | 297/229 |
| 2008/0258528 A1 * | 10/2008 | Bush | B62B 3/144 |
| | | | 297/256.17 |
| 2010/0065172 A1 | 3/2010 | Dus | |
| 2010/0109399 A1 * | 5/2010 | Rockwell | B60N 2/6063 |
| | | | 297/219.12 |
| 2010/0314915 A1 | 12/2010 | Mills | |
| 2011/0012404 A1 * | 1/2011 | Cariera | A47D 1/00 |
| | | | 297/219.12 |
| 2013/0264852 A1 * | 10/2013 | Zack | A47C 31/11 |
| | | | 297/219.12 |

* cited by examiner

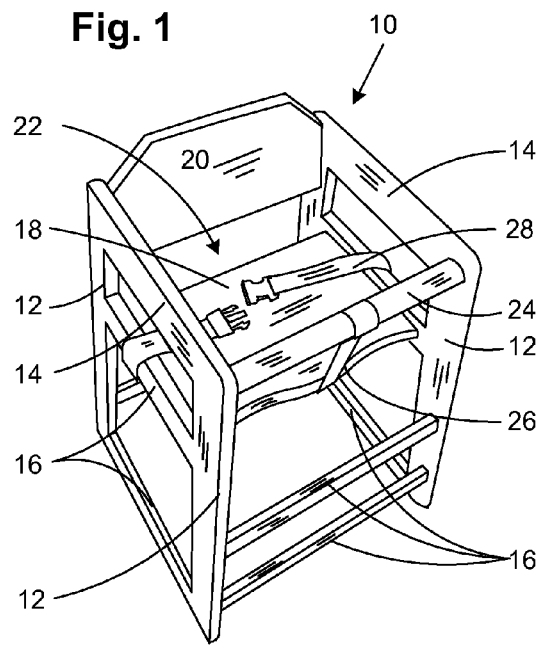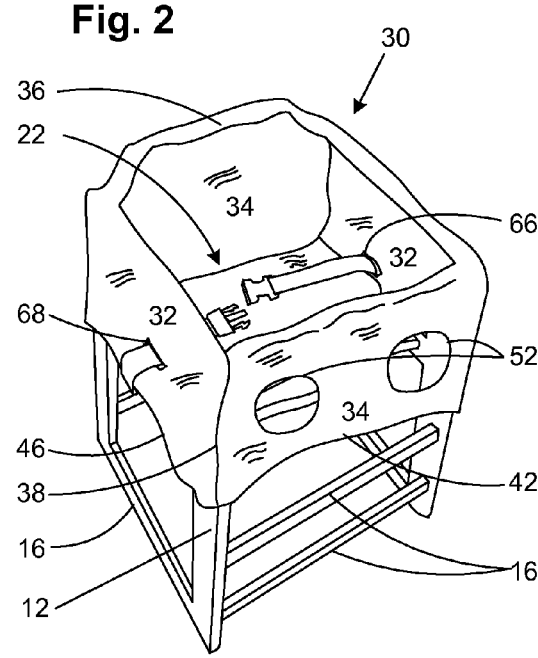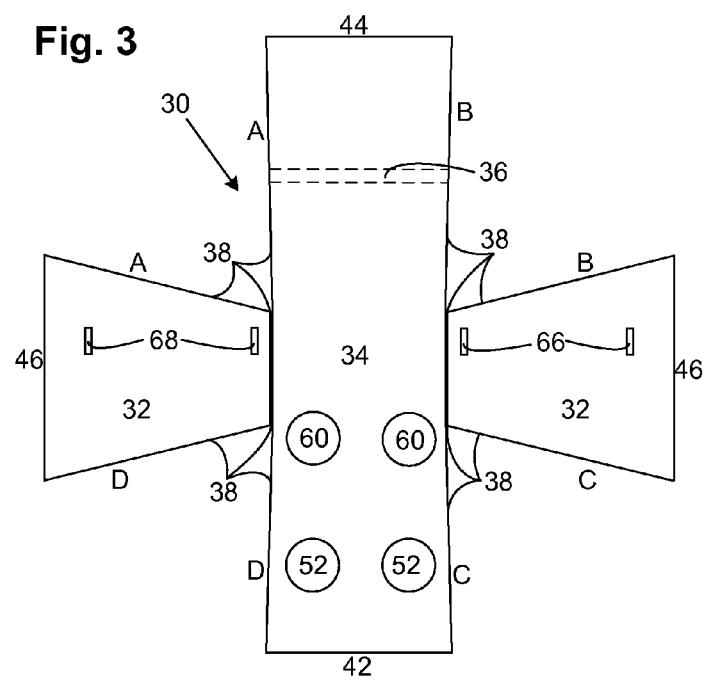

Fig. 10
Fig. 11
Fig. 12
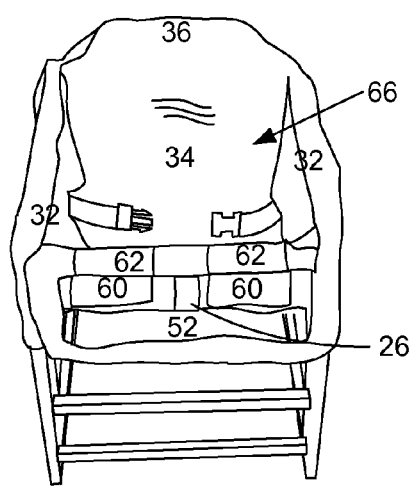
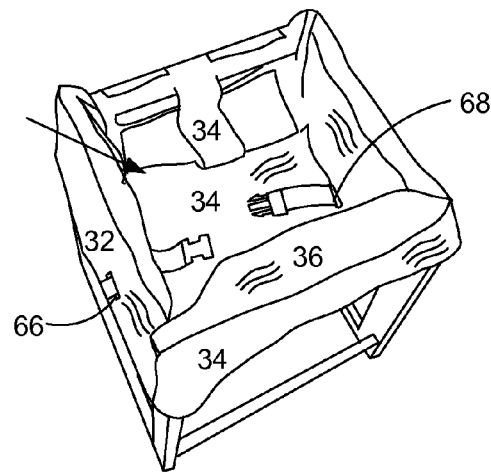
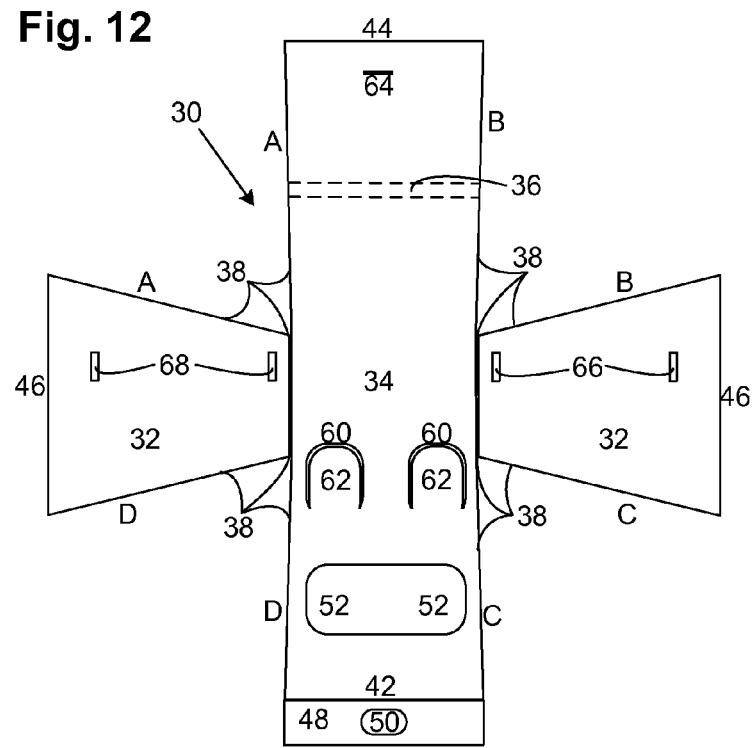

Fig. 13

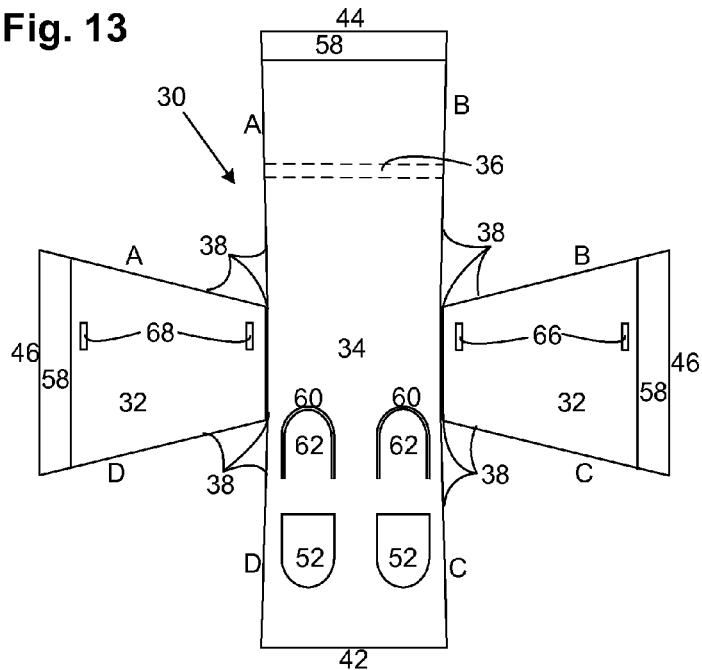

10 high chair
12 side frame
14 arm
16 cross members
18 seat
20 back
22 seating volume
24 safety bar
26 safety strap
28 seatbelt
30 disposable cover
32 side panel
34 center panel
36 back relief
38 seams
40 large opening
42 front edge
44 back edge
46 side edges
48 drape portion
50 handle structure
52 outside leg apertures
54 outside portion
56 inside portion
58 pockets
60 inside leg apertures
62 flap
64 adhesive strip
66 left complementary pair of seatbelt apertures
68 right complementary pair of seatbelt apertures Preferred Scale for Fig. 13: This box is 12" x 12"

DISPOSABLE COVER FOR A HIGH CHAIR

BACKGROUND OF THE INVENTION

High chairs provided by restaurants for young children are a fairly standard size and shape, usually constructed of wood, and rarely clean enough to meet the cleanliness standards a parent desires for their child while dining Numerous re-useable high chair covers are available for parents to buy. A few disposable high chair covers have been designed, but the means for securing such a cover is typically inadequate, and therefor disposable high chair covers rarely perform their intended purpose for very long once a child becomes active.

A particular problem with high chair covers is that their single pair of leg apertures provides a means for a child to inadvertently pull the cover into the child's lap unless there are adequate straps, fasteners and/or adhesives that prevent it. There is a need for a disposable cover for a high chair that is easy to install, yet difficult for a child to displace while the child is simply acting their age.

SUMMARY OF THE INVENTION

The present invention is a disposable cover for a child's high chair of the type commonly found in restaurants. The unique aspect of the disposable cover is that a child's legs pass through two complementary pairs of leg apertures such that each of the child's legs are used to secure the disposable cover in position, thereby preventing an outside portion of the disposable cover from being pulled into the seating volume of a high chair. After a disposable cover is draped over a safety bar (or hand rest) of the high chair, each complementary pair of leg apertures is positioned face-to-face while a child's legs pass through the leg apertures. The child's legs become fasteners, similar to cotter pins, that maintain the face-to-face position of each of the complimentary pairs. While a child squirms about, the disposable cover is being pulled down and positioned over a high chair's safety bar in substantially the same direction it is pulled down and positioned when installed over the high chair.

The disposable cover is preferably made from a thin plastic material, such as one of the material types commonly used to make disposable table covers. When installed over a high chair, there is an inside portion of the disposable cover inside which a child sits, and there is an outside portion of the disposable cover that covers most of the outside of the high chair that is within the child's reach. There are preferably two complementary pairs of leg apertures, a left pair and a right pair, that align when a child is positioned in a high chair that is covered with the disposable cover. A child's torso holds the inside portion of the disposable cover inside the seating volume of the high chair while the child's legs prevent the outside portion of the disposable cover from slipping up and into the seating volume. In a preferred embodiment of the invention, there are inside and outside pairs of seatbelt apertures that function in substantially the same manner as the pairs of leg apertures, wherein the seatbelt is used to align complementary pairs of seatbelt apertures.

BRIEF DESCRIPTION OF THE DRAWINGS

FIG. 1 is a perspective view of a high chair of the type commonly provided by restaurants.

FIG. 2 is a perspective view of the high chair of FIG. 1 that has been covered with a disposable cover of the present invention.

FIG. 3 is a plan view of the panels used to construct the disposable cover of FIG. 2.

FIG. 10 is a front perspective view of the high chair of FIG. 1 that has been covered with an alternate disposable cover of the present invention.

FIG. 11 is a rear perspective view of the high chair and disposable cover of FIG. 10.

FIG. 12 is a plan view of the panels used to construct the disposable cover of FIG. 10.

FIG. 13 is a plan view of the panels used to construct with an alternate disposable cover characterized by flaps.

Figure 4:
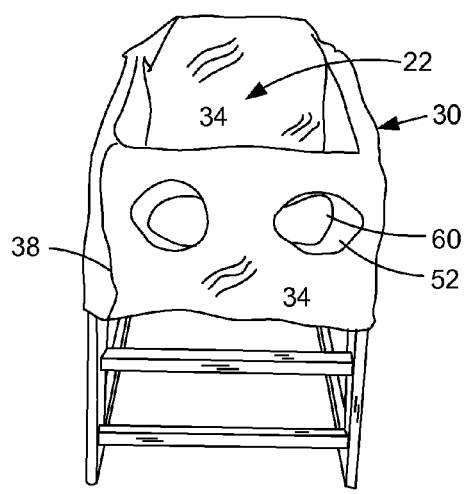
FIG. 4 is a front perspective view of the high chair and disposable cover of FIG. 2.
Figure 5:
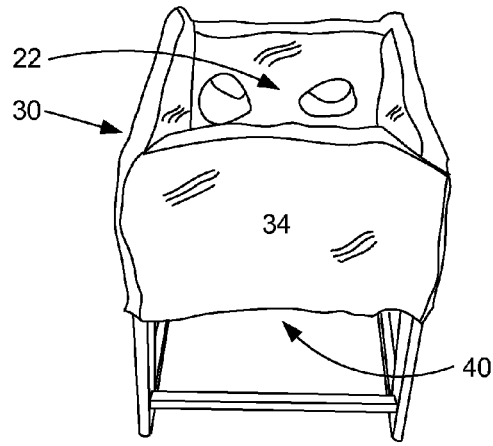
FIG. 5 is a back perspective view of the high chair and disposable cover of FIG. 2.
Figure 6:
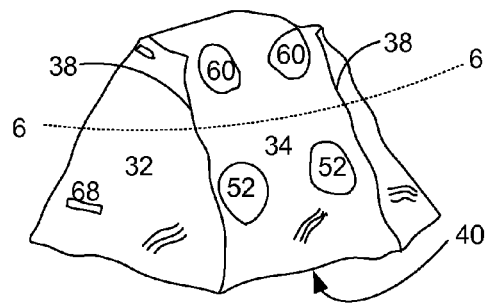
FIG. 6 is perspective view of just the disposable, laid flat to predominantly show the front and side of the disposable cover of FIG. 2.
Figure 7:
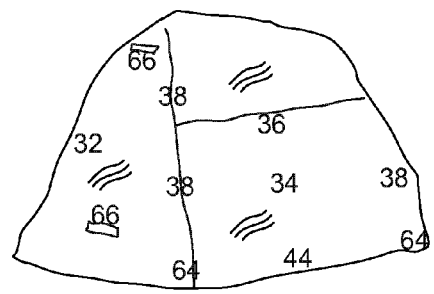
FIG. 7 is perspective view of just the disposable, laid flat to predominantly show the side and back of the disposable cover of FIG. 2.
Figure 8:
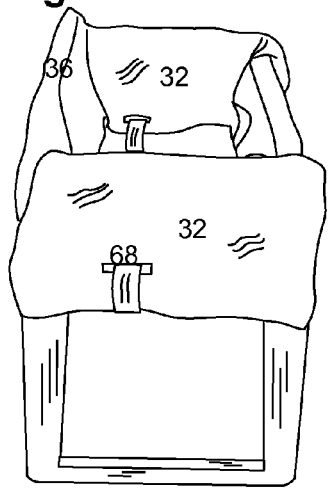
FIG. 8 is side perspective view of the high chair and disposable cover of FIG. 2.
Figure 9:
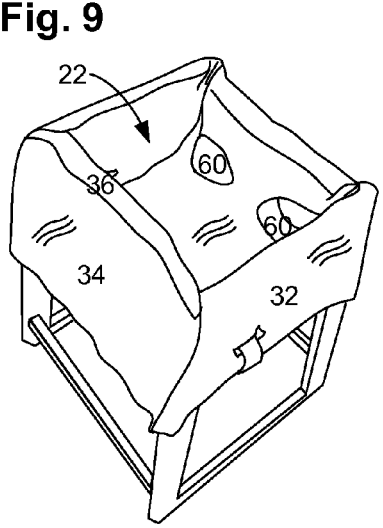
FIG. 9 is another perspective view of the high chair and disposable cover of FIG. 2.

The following is the list of numerical callouts used in FIGS. 1-13:

10 high chair
12 side frame
14 arm
16 cross members
18 seat
20 back
22 seating volume
24 safety bar
26 safety strap
28 seatbelt
30 disposable cover
32 side panel
34 center panel
36 back relief
38 seams
40 large opening
42 front edge
44 back edge
46 side edges
48 drape portion
50 handle structure
52 outside leg apertures
54 outside portion
56 inside portion
58 pockets
60 inside leg apertures
62 flap
64 adhesive strip
66 left complementary pair of seatbelt apertures
68 right complementary pair of seatbelt apertures

DETAILED DESCRIPTION OF THE INVENTION

The present invention is a disposable cover 30 that is partially positioned inside a seating volume 22 of a high chair 10 and partially positioned over the outside of the high chair. There are preferably two complementary pairs of leg apertures in the disposable cover. Each of a child's legs pass through a complementary pair to maintain a face-to-face alignment of the complementary pairs, thereby preventing an outside portion of the disposable cover from being pulled into the seating volume of the high chair. This detailed description will begin by generally describing a high chair, and then by describing the preferred disposable cover used with the high chair. Alternate embodiments will be presented after a preferred feature is described. Throughout this description and the claims, the terms "top" and "bottom" assume an orientation of an upright high chair, such as the orientation shown in FIG. 1; and the terms "left," "right," "front" and "back" are relative to those of a child positioned by an observant parent/caretaker into the seating volume of a high chair. Callouts for functionally similar features will retain their original numbering.

As exemplified in FIG. 1, a typical high chair 10 provided by a restaurant for the children of patrons is frequently constructed using solid wood held together by screws and dowels. A left and a right side frame 12, commonly constructed using 1"×3" lumber, have uppermost horizontal portions that function as arms 14 of the high chair. An assembled high chair will have an overall arm height that is typically just a few inches shorter than a standard table height of about 30 inches. The overall shape of a high chair is typically a trapezoidal prism because a relatively wider stance provides good stability. Two or more cross members 16, along with a seat 18 and a back 20 that support a child in the seating volume 22 of the high chair, are used to join the side frames. A safety bar 24, or hand rest, defines the front of the seating volume. To prevent a child from slipping or climbing out of the seating volume of the high chair, a safety strap 26 and seatbelt 28 are provided. One end of the safety strap preferably wraps around the safety bar at about its midpoint, and the other end of the safety strap is secured to the bottom of the seat using a fastener. When a child is positioned in the seating volume of the high chair, the child's legs are inserted between the safety bar and seat such that the legs straddle the safety strap.

As shown in FIGS. 2 and 4-11, the preferred material for making the disposable cover 30 is plastic, such as PVC, polypropylene, or any of the plastics commonly used to make disposable table covers and other similar products. The preferred method of manufacture is to sew, weld or otherwise seam two die cut side panels 32 to a die cut center panel 34, but there are numerous other known methods of manufacture that are suitable and obvious alternatives. Because the back 20 of a high chair 10 is usually taller than the arms 14, an appropriate relief 36 should be added to the center panel, preferably when seams 38 of the various panels are joined. Referring to FIGS. 3, 12 and 13, the edges of the center panel and side panels are joined such that edge A of a side panel is joined to edge A of the center panel; and similarly, edge B is joined to edge B, C to C, and D to D. If not cut to be continuous, the adjacent edges shown in FIGS. 3, 12 and 13 should be joined by seams. The overall shape, size and thickness of the disposable cover roughly resembles a common kitchen garbage bag, with a preferred disposable cover height of a little more than twice the height of the seating volume 22, and a large opening 40 that fits over the high chair until it is pulled down to a little below the height of the seat 18. The large opening is defined by edges, namely a front edge 42, a back edge 44 and two side edges 46. For the best fit, it is preferred that the disposable cover has a taper that loosely conforms to the trapezoidal prism shape of the high chair 10. The large opening of the disposable cover should fit tightly around the high chair if pulled down over the high chair until it is a little below the height of the seat, preferably by a couple of inches, but the trapezoidal prism shape of the high chair physically prevents the disposable cover from being installed too far down and over the high chair. When correctly pulled over the high chair, the large opening of the disposable cover will not noticeably slide up much higher than about the height of the seat so long as the front edge of the large opening is held at or below the height of the seat. It is important that the entire circumference of the large opening, as defined by the various edges of the disposable cover, is continuous, or somehow joined to be continuous, so there is a tight fit that prevents a back edge or side edge of the large opening from slipping up and into the seating volume. Excess material could be provided, such as by offering an extra drape portion 48 that depends from the front edge of the large opening, or by offering handle structures 50 that depend from the side edges of the large opening, as shown in FIG. 12, but such excess material is not part of the various edges because it does not define the large opening.

The weight of a child's legs, when passed through outside leg apertures 52 in the outside portion 54 of the disposable cover 30, hold the front edge 42 of the large opening 40 in the disposable cover at or below the height of the seat 18, frequently against a front of the seat, which subsequently prevents all of the various edges 42, 44 and 46 of the large opening of the disposable cover from noticeably sliding above the height of the seat. Ideally, about half of the disposable cover will be positioned inside the seating volume 22 of the high chair, and about half of the disposable cover is positioned over the outside of the high chair, such that the outside portion and an inside portion 56 are delineated approximately where the disposable cover overlies the arms 14, back 20, and safety bar 24, said delineation being approximately along dotted line 6-6 in FIG. 6. Extending the outside portion very far below the height of the seat is probably a waste of material because a child is blocked by the arms of the high chair from reaching that far away from the seating volume, so there is no need to cover unreachable parts of the high chair. Although not preferred, it is recognized that pockets 58 could be added along the back edge and/or side edges of the large opening for temporarily storing toys, baby supplies, or for catching stuff dropped by a child. Such pockets, shown in FIG. 13, may also prove beneficial if they hold weight that pulls down the large opening if it is accidentally upwardly displaced.

The most important aspect of the present invention is the outside leg apertures 52 in the outside portion 54 of the disposable cover 30 which utilize a child's legs for the purpose of positioning and securing the front edge 42 of the large opening 40 in the disposable cover at or below the height of the seat 18. When the front edge is held in a desired position, the rest of the large opening is pulled tighter and tighter against the outside of the high chair as it slips up from any tugs or pulls from a child. The large opening won't slide up very far before the fit becomes too tight to allow any further creep of the disposable cover up and into the seating volume 22 of the high chair. As shown in FIGS. 2-9, the most preferred outside leg apertures are two circular cutouts, each having about a 4 inch diameter, with the closest perimeters of the outside leg apertures being about 3 inches apart. The disposable cover material that is between the outside leg apertures disposable covers the outside of the safety strap 26. Optionally, the disposable cover material between the outside leg apertures can be cut, or the material between the apertures can be eliminated such that there is one large cutout that provides the outside leg apertures, as shown in FIGS. 10-12, and the outside leg apertures are only separated by the safety strap of the high chair. Although rounded corners are more resistant to tearing, the outside leg apertures can be other than circular, such as rectangular, or even fun shapes, such as a heart shape or an elephant cutout.

Obviously, there needs to be either one large inside leg aperture through the inside portion 56 of the disposable cover 30, or, alternatively, two smaller inside leg apertures 60, so a child's legs can pass through the inside portion of the disposable cover before then passing through the outside leg apertures 52. The size and relative position of the inside leg apertures should compliment the size and relative position of the outside leg apertures such that there are left and right complimentary pairs of leg apertures, each of the pairs being substantially in face-to-face alignment when the disposable cover is installed over a high chair. When draped over the safety bar 24 until the complimentary pairs of leg apertures are aligned, bringing a bottom portion of the leg apertures into contact with the front of the seat 18 should cause the disposable cover to be lightly pulled against the safety bar. This relatively snug fit is preferred, but it should not be so tight as to cause discomfort to a child's legs. The distance from the front of the seat to the top of the safety bar should be approximately equal to the distance from a bottom of any of the leg apertures to the closest point on the line that delineates the inside portion from the outside portion of the disposable cover It is intended that the leg apertures will deform and stretch to accommodate various leg sizes and positions.

An alternative embodiment of the leg apertures has both of either the inside leg apertures or outside leg apertures only partially cut out, leaving a flap 62 that depends from a top of the apertures at about a height where the apertures with flaps are adjacent a bottom of the safety bar 24, as shown in FIGS. 10-13. A bottom portion of the flaps are provided with adhesive strips 64 such that the flaps can be wrapped at least once around the safety bar and fixed to the disposable cover material using the adhesive to provide a tightly wrapped safety bar. Because the safety bar is in front of a child, it is likely to encounter the most interaction with a child's hands, so this extra step of securing the disposable cover around the safety bar further assists in maintaining proper alignment of the disposable cover over the high chair. For added strength, the apertures with flaps are otherwise circular or have rounded corners.

Similar to the way a child's legs align and hold down the complimentary pairs of leg apertures, the seatbelt 28 of the high chair 10 can be used to hold down the disposable cover 30 by passing through left and right complimentary pairs of seatbelt apertures 66 and 68 positioned at about the height of the seat 18 on the left and right side panels 32 of the disposable cover, as shown in FIGS. 2-13. Similar to the outside and inside leg apertures 52 and 60, there are outside and inside seatbelt apertures that are positioned face-to-face such that the seatbelt will gently pull the disposable cover down and against the arms 14 of the high chair. The various seatbelt apertures do not need to consider the comfort of the seatbelt, so the only necessary consideration is not over stressing the disposable cover material. Although the four seatbelt apertures could be simple horizontal slits, it is preferred that they be easily identifiable cutouts that are preferably oval or rectangular in shape. Horizontally positioned seatbelt apertures are preferably at least 2 inches wide and about a half inch tall so it is easy to manipulate the seatbelt through the seatbelt apertures.

Even with all of the above leg and seatbelt apertures working properly to prevent the disposable cover from slipping into the seating volume of the high chair, there is a window of opportunity for the disposable cover to slip off before or during the process of securing a child in the seating volume of the high chair. The addition of some additional adhesive strips 64 that join the disposable cover 30 to itself is preferred to deal with this scenario. There is almost always a large gap between the back and the seat of the high chair where the inside and outside portions of the disposable cover meet face-to-face. An adhesive strip centered in this gap will prevent the disposable cover from slipping off when the high chair does not hold an occupant. Similarly, adhesives strips can be added to adhere the inside and outside portions of the disposable cover that meet below the arms of the high chair. Peel-and-stick strips provided on the outside portion of the disposable cover that faces the inside portion of the disposable cover are preferred because they are easy to locate on a relatively thin disposable cover material. Other adhesive strips may be added as desired, even adhesive strips that stick to the high chair itself. After a disposable cover is used, it can be removed by simply tearing apart the adhesive strips and properly disposing the soiled disposable cover.

While a preferred form of the invention has been shown and described, it will be realized that alterations and modifications may be made thereto without departing from the scope of the following claims.

What is claimed is:

1. A disposable cover in combination with a child's high chair, comprising:
   a high chair characterized by a safety bar;
   a disposable cover characterized by an inside portion that is positioned inside a seating volume of the high chair, and an outside portion that is positioned over at least part of an outside of the high chair;
   inside leg apertures in the inside portion of the disposable cover; and
   outside leg apertures in the outside portion of the disposable cover; and wherein said inside leg aperture and said outside leg aperture are spaced by the safety bar.

2. The disposable cover of claim 1 wherein the inside leg apertures are characterized by a left cutout and a right cutout; and wherein the outside leg apertures are characterized by a left cutout and a right cutout.

3. The disposable cover of claim 1 wherein a distance from a bottom portion of the inside leg apertures to a bottom portion of the outside leg apertures is approximately equal to twice a distance from a front of a seat of the high chair to a top of the safety bar.

4. The disposable cover of claim 1 wherein the inside leg apertures are a single cutout in the inside portion of the disposable cover that is vertically divided by a safety strap of the high chair, the safety strap extending from a midpoint of the safety bar to a bottom portion of a seat of the high chair.

5. The disposable cover of claim 1 wherein the outside leg apertures are a single cutout in the outside portion of the disposable cover that is vertically divided by a safety strap of the high chair, the safety strap extending from a midpoint of the safety bar to a bottom portion of a seat of the high chair.

6. The disposable cover of claim 1 wherein the disposable cover is characterized by a large opening that is defined by a front edge, a back edge and two side edges, the large opening being continuous.

7. The disposable cover of claim 6 wherein the outside portion is tapered such that a circumference of the large opening of the disposable cover is larger than a circumference defined by where the inside portion of the disposable cover and the outside portion of the disposable cover are delineated.

8. The disposable cover of claim 6 further comprising at least one pocket along the back edge or one of the two side edges.

9. The disposable cover of claim 1 further comprising a left complimentary pair of seatbelt apertures in the inside portion and the outside portion of a left panel of the disposable cover; and a right complimentary pair of seatbelt apertures in the inside portion and the outside portion of a right panel of the disposable cover.

10. The disposable cover of claim 1 further comprising a left complimentary pair of seatbelt apertures in the inside portion and the outside portion of a left panel of the disposable cover that are positioned face-to-face at about a height of a seat of the high chair when the disposable cover is pulled tightly over a left arm of the high chair; and a right complimentary pair of seatbelt apertures in the inside portion and the outside portion of a right panel of the disposable cover that are positioned face-to-face at about a height of a seat of the high chair when the disposable cover is pulled tightly over a right arm of the high chair.

11. The disposable cover of claim 1 wherein a center panel of the disposable cover provides a relief that fits around a raised back of the high chair.

12. The disposable cover of claim 1 wherein the disposable cover is characterized by a large opening that is defined by a front edge, a back edge and two side edges; the large opening being continuous such that it fits tightly around the high chair at a height that is below the height of a seat of the high chair, but the high chair has a trapezoidal prism shape that prevents the large opening from being pulled much lower than the height of the seat.

13. The disposable cover of claim 1 wherein the leg apertures are circular cutouts.

14. The disposable cover of claim 1 wherein the leg apertures are characterized by at least two rounded corners.

15. The disposable cover of claim 1 further comprising a flap that depends from a top portion of each of the inside leg apertures.

16. The disposable cover of claim 15 further comprising an adhesive strip on a bottom potion of each flap such that each flap can be wrapped around the safety bar and adhesively fixed to the disposable cover.

17. The disposable cover of claim 1 further comprising a flap that depends from a top portion of each of the outside leg apertures.

18. The disposable cover of claim 17 further comprising an adhesive strip on a bottom potion of each flap such that the flaps can be wrapped around the safety bar and adhesively fixed to the disposable cover.

19. The disposable cover of claim 1 further comprising an adhesive strip on a back portion of the outside portion of the disposable cover that is adhesively fixed to a back portion of the inside portion of the disposable cover at a location where the inside portion and outside portion meet face-to-face below a back of the high chair.

* * * * *